(12) United States Patent
Padeski et al.

(10) Patent No.: US 7,609,481 B1
(45) Date of Patent: Oct. 27, 2009

(54) OPPOSITELY DEFLECTED SUSPENSION FLEXURE PROVIDING INCREASED DIMPLE CONTACT FORCE

(75) Inventors: Jason Padeski, Temecula, CA (US); Johnathan Phu, Temecula, CA (US); Shijin Mei, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 1024 days.

(21) Appl. No.: 11/104,381

(22) Filed: Apr. 11, 2005

Related U.S. Application Data

(60) Provisional application No. 60/655,655, filed on Feb. 22, 2005.

(51) Int. Cl.
*G11B 5/48* (2006.01)
(52) U.S. Cl. .................................................. 360/245.6
(58) Field of Classification Search ................ 360/245, 360/245.1, 245.2, 245.3, 245.4, 245.6, 245.7
See application file for complete search history.

(56) References Cited

U.S. PATENT DOCUMENTS

| | | | | |
|---|---|---|---|---|
| 4,399,476 A | * | 8/1983 | King ....................... | 360/245.5 |
| 4,449,155 A | * | 5/1984 | Meier et al. .............. | 360/245.6 |
| 4,853,813 A | * | 8/1989 | Yamanouchi ............ | 360/246.8 |
| 4,876,623 A | * | 10/1989 | Takekado ................ | 360/246.4 |
| 5,473,488 A | * | 12/1995 | Gustafson et al. ....... | 360/245.5 |
| 5,608,590 A | * | 3/1997 | Ziegler et al. ........... | 360/245.5 |
| 5,666,241 A | | 9/1997 | Summers | |
| 5,852,532 A | | 12/1998 | Summers | |
| 5,896,247 A | | 4/1999 | Pan et al. | |
| 6,005,760 A | | 12/1999 | Holce et al. | |
| 6,011,671 A | | 1/2000 | Masse et al. | |
| 6,021,022 A | | 2/2000 | Himes et al. | |
| 6,043,956 A | | 3/2000 | Hanya et al. | |
| 6,067,209 A | * | 5/2000 | Aoyagi et al. ............ | 360/254.7 |
| 6,078,473 A | | 6/2000 | Crane et al. | |
| 6,226,154 B1 | * | 5/2001 | Albrecht ................... | 360/254.8 |
| 6,266,214 B1 | | 7/2001 | Khan | |
| 6,353,515 B1 | | 3/2002 | Heim | |
| 6,373,662 B1 | | 4/2002 | Blaeser et al. | |
| 6,377,425 B1 | | 4/2002 | Khan | |
| 6,388,843 B1 | | 5/2002 | Takagi et al. | |
| 6,389,684 B1 | | 5/2002 | Toensing et al. | |
| 6,522,503 B2 | | 2/2003 | Takadera et al. | |
| 6,532,135 B1 | | 3/2003 | Chen et al. | |
| 6,587,309 B2 | | 7/2003 | Nojima | |
| 6,597,538 B1 | | 7/2003 | Kashima et al. | |
| 6,597,541 B2 | | 7/2003 | Nishida et al. | |
| 6,690,547 B2 | | 2/2004 | Wada et al. | |
| 6,757,137 B1 | | 6/2004 | Mei | |
| 6,791,798 B1 | | 9/2004 | Mei | |
| 6,801,400 B2 | | 10/2004 | Fu et al. | |

\* cited by examiner

*Primary Examiner*—Angel A. Castro
(74) *Attorney, Agent, or Firm*—Intellectual Property Law Offices of Joel Voelzke, APC

(57) ABSTRACT

Method and apparatus in which a disk drive suspension flexure tongue supports a slider. A flexure frame attached to a suspension supports the tongue in dimple engagement with the suspension. Spaced, separate biasing structures on the frame act oppositely on the tongue for a net increase in tongue dimple contact force.

20 Claims, 3 Drawing Sheets

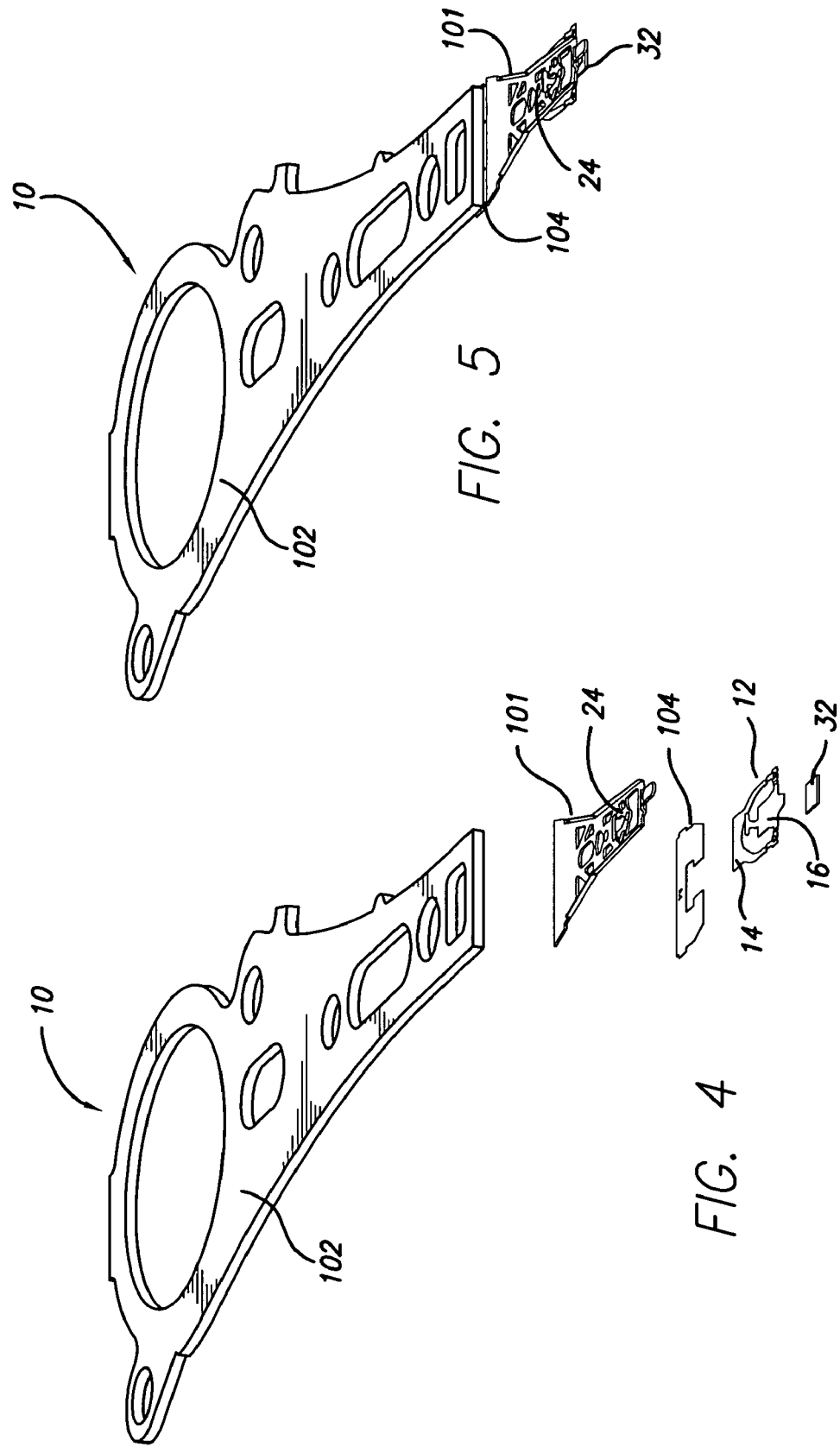

OPPOSITELY DEFLECTED SUSPENSION FLEXURE PROVIDING INCREASED DIMPLE CONTACT FORCE

RELATED APPLICATION

This application claims the benefit of U.S. Provisional Application Ser. No. 60/655,655, filed Feb. 22, 2005.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions and more particularly to flexures for disk drive suspensions. The invention flexures have a slider supporting tongue engaged with a dimple and carried on a frame having separate and oppositely acting biasing structures for a net increase the contact force of the tongue on the dimple.

2. Description of the Related Art

Flexures are relatively more flexible and springy members of disk drive suspensions. A typical suspension includes a load beam having a mounting base attached to an actuator, a hinge or spring, and a beam. The flexure is supported by the beam. Flexures typically comprise a frame and a cantilevered tongue extending from and usually within the frame. The frame includes a usually proximate base that attaches to the suspension beam, a transversely disposed, usually distal cross member, and left and right struts that connect the base and cross-member. The tongue typically projects from a central portion of the cross-member. The flexure tongue carries a slider (an aerodynamic body containing the read/write head) for travel over the surface of a disk in gimballing relation to accommodate the many forces on the suspension while keeping at the intended track on the disk. Maintaining correct track registration of the slider requires good contact force from the tongue on the dimple, a curved, protuberant surface usually formed on the load beam but sometimes on the tongue.

The force on the slider reflects the force on the tongue and the tongue force is dependent, assuming a given dimple height, on the bias on the tongue toward the dimple. It is known to offset the plane of the tongue from the plane of the base by locally deflecting the cross-member to allow for tongue movement without frame interference and this also biases the tongue toward the dimple.

BRIEF SUMMARY OF THE INVENTION

The invention reverses the normal offset of the tongue from the plane of the base, reducing tongue contact force, but more than compensates for this loss of dimple contact bias by providing a separate and spaced deflection of another part of the frame for a net increased biasing of the tongue into dimple contact while observing the many constraints of space and materials that dictate disk drive suspension engineering.

It has been discovered that these constraints can be observed and nonetheless an increased dimple contact force obtained by opposing but unequal first and second deflections in the flexure frame, one in the cross-member and one in the struts.

It is an object of the invention therefore to provide an improved disk drive suspension for a disk drive. It is a further object to provide a suspension having a flexure providing increased dimple contact force of the flexure tongue through net increased biasing of the tongue onto the suspension dimple. Yet another object is to provide a doubled and opposite deflection in a flexure for increased dimple contact force.

These and other objects of the invention to become apparent hereinafter are realized in a disk drive suspension having a flexure comprising a frame and a tongue adapted for dimple contact, and spaced, separate biasing structures on the frame acting oppositely on the tongue for a net increase in tongue dimple contact force, and the method of manufacturing a disk drive suspension flexure including forming a flexure frame supporting a tongue, and forming separate, spaced and oppositely acting biasing structures in the frame for a net increase in tongue dimple contact force.

More particularly, the invention provides a disk drive suspension flexure comprising a tongue for supporting a slider, and a tongue-supporting frame having an attachment locus at which the frame is attachable to a suspension that provides a dimple for gimballing engagement with the tongue, the frame being twice deflected relative to the attachment locus in a manner bringing the tongue closer to the dimple, whereby the tongue is biased into closer contact with the dimple.

In this and like embodiments, typically, the suspension flexure has a longitudinal axis, and the flexure frame comprises a base defining the plane of the attachment locus, a cross-member spaced therefrom, and left and right struts extending between the base and the cross-member generally parallel with the suspension longitudinal axis, the tongue extending from a central portion of the cross-member toward the base, the cross-member central portion is deflected from the general plane of the cross-member and away from the attachment locus plane to bias the tongue extending therefrom into less close contact with the dimple, the left and right struts each have a portion extending from and supporting the cross-member, each of the strut portions being locally deflected a like amount and direction to deflect the portions from the general plane of their respective the struts and from the general plane of the cross-member and toward the attachment locus plane to bias the tongue into closer contact with the dimple, and the cross-member central portion is separately deflected from the general plane of the cross-member and deflected oppositely to the strut portions deflections and away from the attachment locus plane to bias the tongue into less close contact with the dimple, wherein the strut portion bias is greater than the cross-member central portion bias on the tongue.

A slider can be mounted on the tongue and the flexure can be combined with a suspension comprising a load beam and a dimple projecting from the load beam toward the flexure tongue.

In a further embodiment, the invention provides a flexure for attachment to a disk drive suspension, the flexure comprising an axially elongated tongue having a first side for supporting a slider away from the suspension, and a tongue-supporting frame comprising a cross-member having a central portion carrying the tongue, a base having in a plane generally parallel with the suspension an attachment locus at which the flexure is attachable to the suspension, and left and right struts connecting the cross-member and base, a dimple between a second side of the tongue and the suspension, the cross-member portion defining a first deflection away from the attachment locus plane to bias the tongue away from the dimple, the struts defining together a second deflection that biases the tongue toward the dimple more than the central portion biases the tongue away from the dimple, whereby contact force between the tongue and the dimple is increased.

In this and like embodiments, typically, the suspension has a longitudinal axis, the cross-member has left and right shoulders defining the flexure first deflection of the cross-member central portion, and the left and right struts have transversely opposed shoulders defining the flexure second deflection, the net deflection biasing of the tongue increasing the contact force between the tongue and the dimple, the cross-member central portion is biased toward the attachment locus plane by the second deflection, the cross-member central portion is deflected from the general plane of the cross-member and toward the attachment locus to bias the tongue extending therefrom away from the dimple, and a slider is mounted on the tongue one side.

In a further embodiment, there is provided a disk drive suspension flexure comprising a tongue for supporting a slider, and a tongue-supporting frame attachable to a suspension providing dimple engagement for the tongue with the suspension, the frame including a first frame portion extending in a first plane for suspension attachment, a second frame portion carrying the tongue, and a third frame portion carrying the second frame portion, the second and third frame portions being oppositely deflected relative to the first portion to provide a net bias on the tongue into the dimple engagement.

In its method aspects, the invention contemplates forming a disk drive suspension flexure for contact with a suspension dimple, including shaping a spring material into a base for attachment to a suspension, a cross-member having a central portion and a tongue supported by the central portion, and left and right struts supporting the cross-member on the base, deflecting the struts to bias the cross-member and tongue toward the dimple, and deflecting the central portion to bias the cross-member and tongue oppositely from and less than the strut deflections, whereby the net bias on the tongue provides increased contact force at the suspension dimple.

The invention method further includes a method of operating a disk drive suspension, including carrying a slider on one side of a tongue carried by a flexure fixed to the suspension, maintaining the other side of the tongue in dimple contact with the suspension, and separately biasing the tongue toward and away from the dimple contact for a net increase in dimple contact force.

BRIEF DESCRIPTION OF THE SEVERAL VIEWS OF THE DRAWINGS

The invention will be further described in conjunction with the attached drawings in which:

FIG. 4 is an exploded oblique view of the disk drive suspension;

FIG. 5 is an assembled view thereof; and,

DETAILED DESCRIPTION OF THE INVENTION

Figure 1:
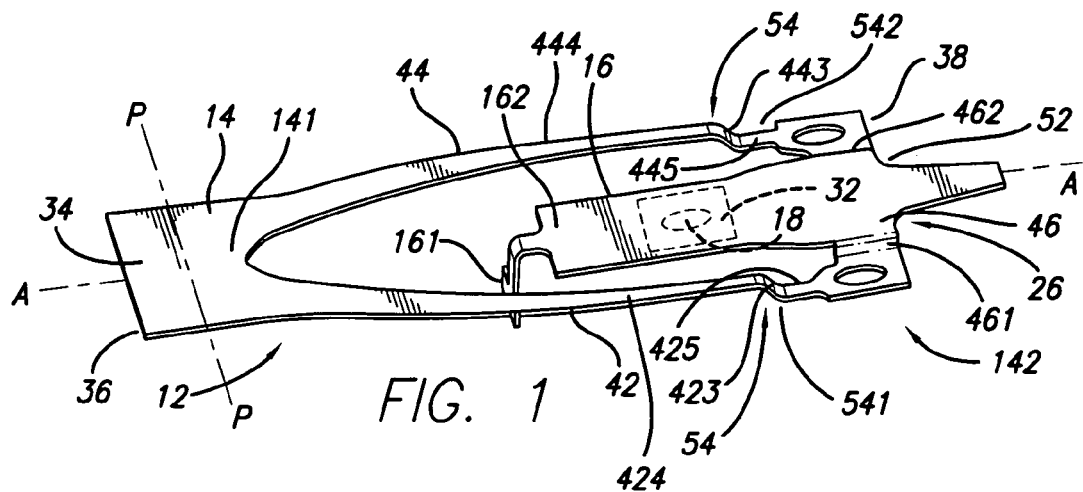
FIG. 1 is an oblique view of the invention suspension flexure, inverted.
Figure 2:
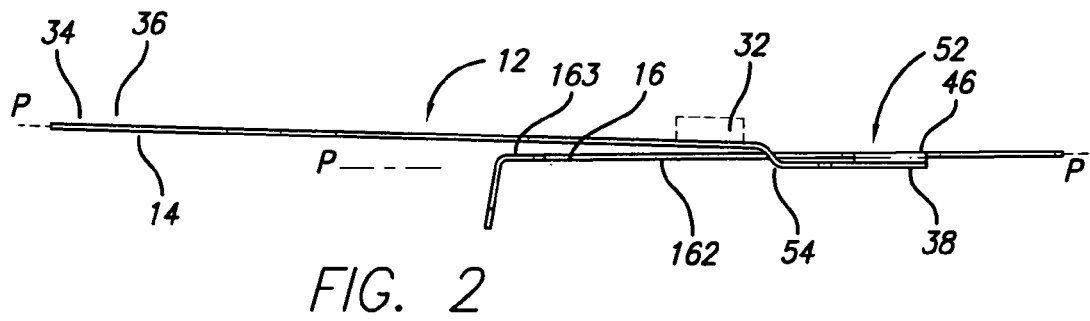
FIG. 2 is a side elevation view thereof.
Figure 3:
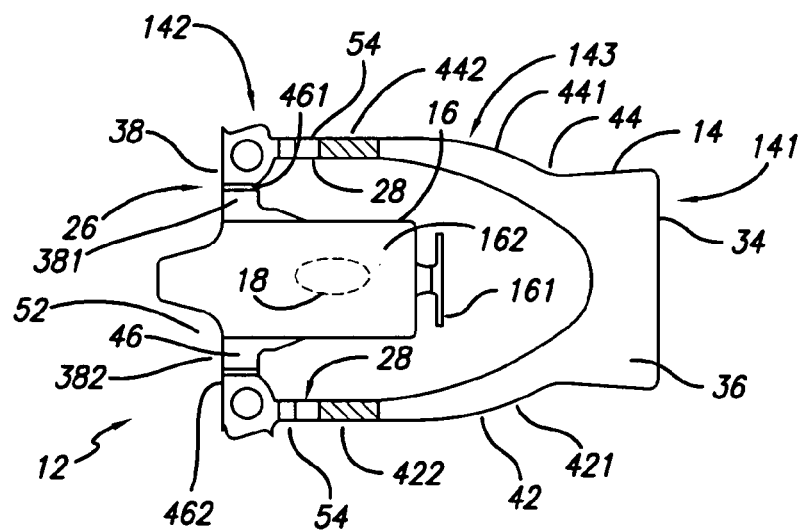
FIG. 3 is a plan view of the flexure.
Figure 6:
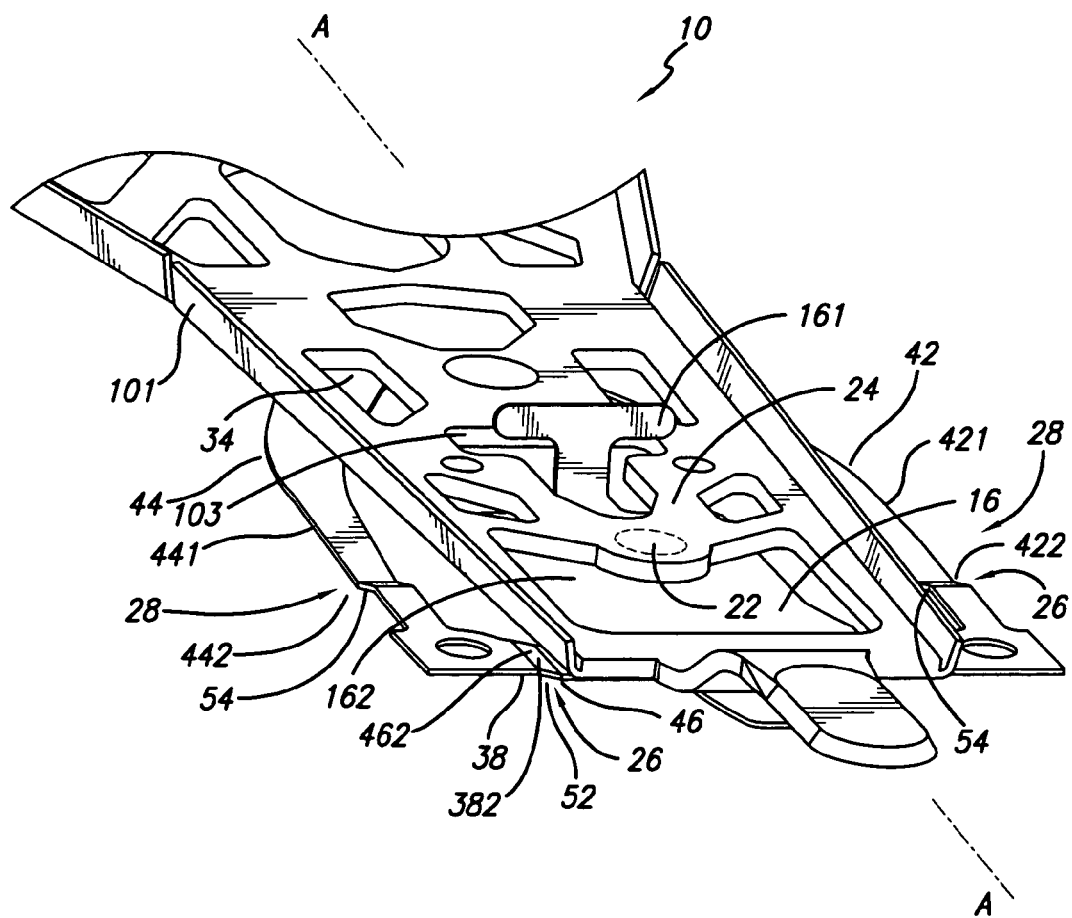
FIG. 6 is an oblique, detail view, enlarged the beam portion and flexure of the suspension.

With reference now to the drawings in detail, in FIGS. 1-6 disk drive suspension 10 comprises a beam 101, a base portion 102 adapted to be mounted to an actuator not shown, and a hinge or spring portion 104. Suspension 10 further includes a flexure 12 comprising a frame 14 and a tongue 16 adapted at 18 for contact with dimple 22 carried by load beam portion 24. Tongue 16 has a terminal T-shaped limiter 161 bent from the plane of the tongue that interfits with slot 103 in suspension beam 101. Flexure 12 has spaced, separate biasing structures 26, 28 on the frame acting oppositely on the tongue 16 for a net increase in tongue dimple contact force.

Flexure tongue 16 supports slider 32. Tongue-supporting frame 14 has a base portion 34 and an attachment locus 36 thereon at which the frame is attachable to suspension 10. Suspension 10 provides dimple 22 for gimballing engagement with the tongue 16. Frame 14 is twice deflected relative to the attachment locus 36 in a manner tending to bring the tongue 16 closer to the dimple 22, whereby the tongue is biased into closer contact with the dimple.

In the embodiment shown, suspension 10 comprises a beam 101 from which dimple 22 protrudes to engage tongue 16 of flexure 12. Flexure 12 has a longitudinal axis A-A. Flexure frame base 34 defines the plane P-P of the attachment locus 36 and further defines flexure cross-member 38 spaced therefrom, and left and right struts 42, 44 extending between the base and the cross-member generally parallel with the longitudinal axis A-A. Tongue 16 extends from a central portion 46 of the cross-member 38 toward the base 34. Cross-member central portion 46 is deflected at 461, 462 from the general plane of the cross-member 38 and away from the attachment locus plane P-P to bias the tongue 16 extending therefrom into less close contact with the dimple 22.

Left and right struts 42, 44 each have a portion 421, 441 extending from and supporting the cross-member 38. Each of the strut portions 421, 441 are locally deflected at 422, 442 a like amount and in a like direction to deflect the portions from the general plane of their respective struts as well as from the general plane of the cross-member 38 and toward the attachment locus plane P-P to bias the tongue 16 into closer contact with the dimple 22. The cross-member central portion 46 is separately deflected from the general plane of the cross-member 38 and deflected oppositely to the strut portions deflections 422, 442 and away from the attachment locus plane P-P to bias the side or surface 162 of tongue 16 into less close contact with the dimple 22. The device is arranged such that the strut portion 42, 44 bias is greater than the cross-member central portion 46 bias on the tongue 16.

Slider 32 is mounted on the second surface 163 of the tongue 16 generally opposite the dimple engagement on the tongue first surface 161, as shown.

More particularly, the invention flexure 12 is arranged for attachment to disk drive suspension 10, with the flexure comprising an axially elongated tongue 16 having a side or surface 163 for supporting a slider 32 away from the suspension 10, and a tongue-supporting frame 14 comprising cross-member 38 having central portion 46 carrying the tongue, a base 34 having in a plane P-P generally parallel with the suspension an attachment locus 36 at which the flexure is attachable to the suspension. Left and right struts 42, 44 connect the cross-member 38 and base 34. A dimple 22 is provided between side 162 of the tongue 16 and the suspension 10. Cross-member portion 46 defines as the biasing structure 26 a first deflection 52 away from the attachment locus plane P-P to bias the tongue 16 away from the dimple 22.

Struts 42, 44 together define as the biasing structure 28 a second deflection 54 that biases the tongue 16 toward the dimple 22 more than the central portion 46 biases the tongue away from the dimple, and contact force between the tongue and the dimple has a net increase.

Further, cross-member 38 has left and right shoulders 381, 382 defining the flexure first deflection 52 of the cross-member central portion 46. Left and right struts 42, 44 have transversely opposed shoulders 423, 443 defining the two opposed portions 541, 542 of the flexure second deflection 54. Since the strut deflection 54 is greater in height (vertical height difference between the strut portions 424, 425 and 444 and 445) its biasing force on tongue 16 is greater than biasing force provided in the opposite direction by the lesser height of the first deflection 52 (vertical difference of the cross-member portions 381, 382 on either side of central portion 46). As a result, net deflection biasing of the tongue 16 provides increased contact force between the tongue and the dimple 22.

The invention comprises, in a further embodiment, a disk drive suspension flexure 12 comprising tongue 16 for supporting a slider 32, and a tongue-supporting frame 14 attachable to suspension 10 to provide dimple 22 engagement for the tongue with the suspension. Frame 14 includes a first frame portion 141 including base 34 extending in a first plane P-P for suspension attachment, a second frame portion 142 including cross-member 38 carrying the tongue, and a third frame portion 143 carrying the second frame portion, the second and third frame portions being oppositely deflected relative to the first portion to provide a net bias on the tongue into the dimple engagement.

In method terms, the invention method includes forming a disk drive suspension flexure 12 for contact with a suspension dimple 22, including shaping a spring material into a base 34 for attachment to the suspension, a cross-member 38 having a central portion 46 and a tongue 16 supported by the central portion, and left and right struts 42, 44 supporting the cross-member on the base, deflecting the struts at 54 to bias the cross-member and tongue toward the dimple, and deflecting the central portion at 52 to bias the cross-member and tongue oppositely from and less than the strut deflections, to provide a net bias on the tongue that increases contact force at the suspension dimple.

In a further embodiment, the invention includes a method of operating disk drive suspension 10, including carrying a slider 32 on one side 163 of a tongue carried by flexure 12 fixed to the suspension, maintaining the other side 162 of the tongue in dimple 22 contact with the suspension, and separately biasing the tongue toward and away from the dimple contact for a net increase in dimple contact force.

The invention thus provides an improved disk drive suspension for a disk drive having a flexure providing increased dimple contact force of the flexure tongue through net increased biasing of the tongue onto the suspension dimple through doubled and opposite deflection in a flexure for increased dimple contact force. The foregoing objects are thus met.

We claim:

1. A disk drive suspension flexure comprising a tongue for supporting a slider, and a flexure frame having an attachment locus at which said frame is attachable to a suspension that provides a gimballing engagement with said tongue, said flexure frame being deflected at a first location away from said attachment locus and being deflected at a second location toward said attachment locus in a manner bringing said tongue closer to said dimple.

2. The disk drive suspension flexure according to claim 1, in which said suspension flexure has a longitudinal axis, and said flexure frame comprises a base defining the plane of said attachment locus, a cross-member spaced therefrom, and left and right struts extending between said base and said cross-member generally parallel with said suspension longitudinal axis, said tongue extending from a central portion of said cross-member toward said base.

3. The disk drive suspension flexure according to claim 2, in which said cross-member central portion is deflected from the general plane of said cross-member and away from said attachment locus plane to bias said tongue extending therefrom into less close contact with said dimple.

4. The disk drive suspension flexure according to claim 2, in which said left and right struts each have a portion extending from and supporting said cross-member, each of said strut portions being locally deflected a like amount and direction to deflect said portions from the general plane of their respective said struts and from the general plane of said cross-member and toward said attachment locus plane to bias said tongue into closer contact with said dimple.

5. The disk drive suspension flexure according to claim 4, in which said cross-member central portion is separately deflected from the general plane of said cross-member and deflected oppositely to said strut portions deflections and away from said attachment locus plane to bias said tongue into less close contact with said dimple, wherein said strut portion bias is greater than said cross-member central portion bias on said tongue.

6. The disk drive suspension flexure according to claim 1, including also a slider mounted on said tongue.

7. In combination: the disk drive suspension flexure of claim 1 and a suspension comprising a load beam and a dimple projecting from said load beam toward said flexure tongue.

8. The disk drive suspension flexure according to claim 1, including also a slider mounted on said tongue one side.

9. A flexure for attachment to a disk drive suspension, said flexure comprising an axially elongated tongue having a first side for supporting a slider away from said suspension, and a tongue-supporting frame comprising a cross-member having a central portion carrying said tongue, a base having in a plane generally parallel with said suspension an attachment locus at which said flexure is attachable to said suspension, and left and right struts connecting said cross-member and base, a dimple between a second side of said tongue and said suspension, said cross-member portion defining a first deflection away from said attachment locus plane to bias said tongue away from said dimple, said struts defining together a second deflection that biases said tongue toward said dimple more than said central portion biases said tongue away from said dimple, whereby contact force between said tongue and said dimple is increased.

10. The disk drive suspension flexure according to claim 9, in which said suspension has a longitudinal axis, said cross-member has left and right shoulders defining said flexure first deflection of said cross-member central portion, and said left and right struts have transversely opposed shoulders defining said flexure second deflection, the net deflection biasing of said tongue increasing the contact force between said tongue and said dimple.

11. The disk drive suspension flexure according to claim 10 in which said cross-member central portion is biased toward said attachment locus plane by said second deflection.

12. The disk drive suspension flexure according to claim 10, in which said cross-member central portion is deflected from the general plane of said cross-member and toward away from said attachment locus to bias said tongue extending therefrom away from said dimple.

13. In combination: the disk drive suspension flexure of claim 9, a beam supporting said flexure, and a read/write head carried by said flexure traveling over the surface of a disk.

14. A disk drive suspension flexure comprising a tongue for supporting a slider, and a tongue-supporting frame attachable to a suspension providing dimple engagement for said tongue with said suspension, said frame including a first frame portion extending in a first plane for suspension attachment, a second frame portion carrying said tongue, and a third frame portion carrying said second frame portion, said second and third frame portions being oppositely deflected relative to said first portion to provide a net bias on said tongue into said dimple engagement.

15. A disk drive suspension having a flexure comprising a frame and a tongue adapted for dimple contact, and spaced, separate biasing structures on said frame acting oppositely on said tongue for a net increase in tongue dimple contact force.

16. A method of manufacturing a disk drive suspension flexure including forming a flexure frame supporting a tongue, and forming separate, spaced and oppositely acting biasing structures in said frame for a net increase in tongue dimple contact force.

17. The method of claim 16, wherein said flexure is supported by a beam, and a read/write head traveling over the surface of a disk is carried by said flexure.

18. A method of forming a disk drive suspension flexure for contact with a suspension dimple, including shaping a spring material into a base for attachment to a suspension, a cross-member having a central portion and a tongue supported by said central portion, and left and right struts supporting said cross-member on said base, deflecting said struts to bias said cross-member and tongue toward said dimple, and deflecting said central portion to bias said cross-member and tongue oppositely from and less than said strut deflections, whereby the net bias on said tongue provides increased contact force at said suspension dimple.

19. The method of claim 18, wherein said flexure is supported by a beam, and a read/write head traveling over the surface of a disk is carried by said flexure.

20. A method of operating a disk drive suspension, including carrying a slider on one side of a tongue carried by a flexure fixed to said suspension, maintaining the other side of said tongue in dimple contact with said suspension, and separately biasing said tongue toward and away from said dimple contact for a net increase in dimple contact force.

* * * * *